Figure 1:
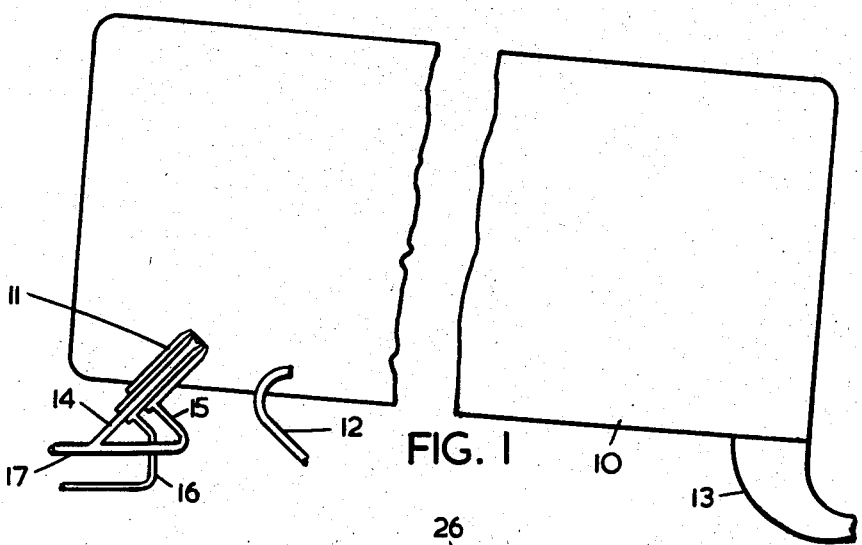

Feb. 16, 1960

D. R. JOHNSTON 2,925,414

MANUFACTURE OF VERY HIGH MOLECULAR
WEIGHT ORGANIC SUBSTANCES

Filed March 4, 1955

2 Sheets-Sheet 1

D. R. JOHNSTON
INVENTOR

ATTORNEYS

Feb. 16, 1960
D. R. JOHNSTON
2,925,414
MANUFACTURE OF VERY HIGH MOLECULAR WEIGHT ORGANIC SUBSTANCES
Filed March 4, 1955
2 Sheets-Sheet 2
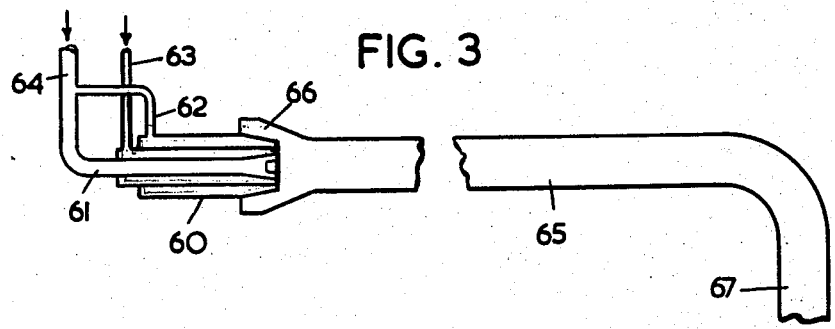
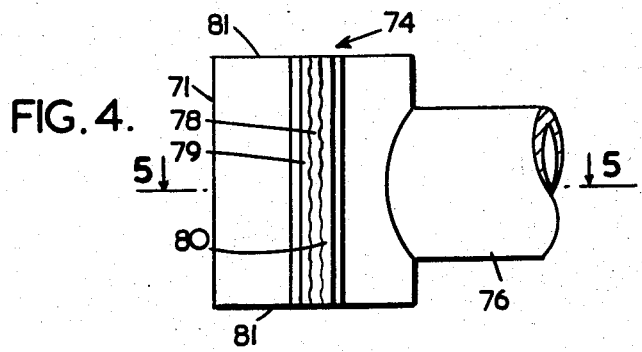
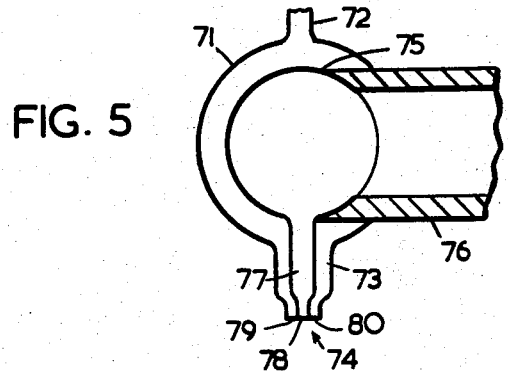
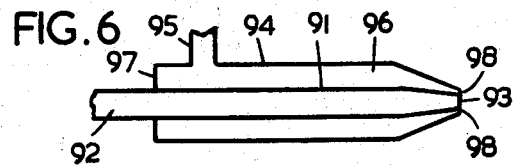
D. R. JOHNSTON
INVENTOR
ATTORNEYS

2,925,414

MANUFACTURE OF VERY HIGH MOLECULAR WEIGHT ORGANIC SUBSTANCES

David Robert Johnston, Spondon, near Derby, England, assignor to British Celanese Limited, a corporation of Great Britain Application March 4, 1955, Serial No. 492,093

Claims priority, application Great Britain March 11, 1954

13 Claims. (Cl. 260—230)

This invention relates to the manufacture of organic substances of very high molecular weight, especially cellulose esters of organic acids such as cellulose acetate, and in particular to their precipitation from solution, and is an improvement in or modification of the invention described in United States patent application Ser. No. 417,170, filed March 18, 1954.

In nearly all the processes used for making cellulose esters of organic acids, the cellulose ester is obtained in solution. Usually the solvent is a lower aliphatic acid, especially acetic acid, which may contain a proportion of water, but it may for example be methylene chloride or ethylene chloride. The cellulose ester is precipitated from the solution by means of a suitable non-solvent; thus it may be precipitated from solution in acetic acid by means of water or an aqueous acetic acid of concentration below about 40%.

The conditions under which the cellulose ester is precipitated are important, for on them depends the form of precipitate obtained. It is for most purposes very desirable to avoid the formation of a horny hard precipitate, since in this form cellulose esters are difficult or virtually impossible to wash properly, and even after prolonged washing may contain an unacceptably high proportion of acid and other impurities. On the other hand, cellulose esters precipitated in the form of a fibrous flake are easy to wash, and this is a form to be aimed at.

The present invention provides a simple method of precipitating from their solutions cellulose acetate and other cellulose esters of organic acids, by means of which the precipitate can be obtained in an easily washed fibrous form. The new method can also be used for precipitating other organic substances of very high molecular weight.

United States patent application Ser. No. 417,170, filed March 18, 1954, describes a method of precipitating cellulose esters and other organic substances of very high molecular weight from their solutions, in which unsupported streams of the solution and of a precipitant are rapidly and intimately intermixed. This mixing may be effected by collision between the streams, especially substantially head-on collision, but is preferably effected by causing unsupported streams of the solution and precipitant to impinge simultaneously on the same area or on immediately adjacent areas of a solid surface.

According to the present invention, organic substances of very high molecular weight, especially cellulose esters of organic acids, are precipitated from their solutions by forming streams of the solution and of a precipitant in contact with one another and flowing in the same general direction, and causing the said streams to intermix intimately and completely while they are still travelling freely, that is to say, before the streams are destroyed as such by impact on a solid or liquid surface or absorption in a body of liquid. (The term "precipitant" is employed in this specification to denote a liquid non-solvent for the organic substance which is miscible with the solvent in which the organic substance is dissolved.) Preferably the stream of solution, or each stream of solution if there is more than one, is bounded on both sides by precipitant.

The streams of solution and precipitant may be caused to intermix while out of contact with any solid surface, for instance by extruding the solution and precipitant under pressure into a precipitating vessel large enough to allow the streams to intermix completely before they strike a wall of the vessel, or the streams may intermix in a closed conduit, or less desirably an open channel, with the wall of which at least one of them is in contact. The direction of travel of the streams may initially be horizontal or vertically up or down, or at an angle between the horizontal and vertical, and may remain the same (as when the streams are confined in a conduit) or may change (as under the action of gravity when the streams are completely unsupported). While the proportions of solution and precipitant in the streams are such that the intermixing of the streams causes substantially complete precipitation of the organic substance, the resulting slurry of precipitate in the mixture of the solvent and precipitant may, if desired, fall into or otherwise be mixed with a further quantity of precipitant. This may be desirable, for instance, in order to obtain the precipitate as a slurry of thinner consistency than would otherwise be the case, or to aid in carrying the precipitate out of a precipitating vessel.

For the sake of brevity, the invention will be further described with particular reference to the precipitation of cellulose acetate from its solutions, especially from solutions such as are obtained in the manufacture of the cellulose acetate.

The cellulose acetate solution may be extruded either at room temperature or at a higher temperature which may be below or above the boiling point of the solvent. For example, solutions of cellulose acetate in acetic acid which have been ripened at an elevated temperature, e.g. a temperature between about 50° and 80° C., may often conveniently be extruded at about the ripening temperature. The precipitant may be at about the same temperature as the cellulose acetate solution, or it may be at a higher or lower temperature. The precipitant, or both the precipitant and the solution, may be heated to a temperature such that part or all of the solvent is vapourised as the streams of solution and precipitant are mixed, particularly when a low boiling solvent such as methylene chloride is used.

The form of the precipitate may be varied to some extent by varying the temperature of the solution; thus if a precipitate is required which, while retaining the fibrous flake form characteristic of the invention, has at the same time a high bulk density, the solution should be at a fairly low temperature, e.g. between about 20° and 40° or 50° C. when precipitating cellulose acetate from solution in acetic acid by means of water or an aqueous acetic acid; conversely if a precipitate of low bulk density is required, the solution should be at a higher temperature, e.g. between about 60° and 80° C. or even higher.

It is of course necessary to ensure that the viscosity of the cellulose acetate solution at the temperature at which it is extruded is such that it is capable of being formed into a fairly rapidly flowing stream without using an undesirably high pressure, and if in any instance the viscosity is too high for this, the solution may be thinned with further quantities of solvent for the cellulose acetate.

The invention includes not only the new precipitation method, but also apparatus for carrying it out comprising a nozzle adapted to form streams of solution and precipitant in contact with one another and flowing in the same general direction and also to give rise to a degree of turbulence in at least one of the said streams such that the streams become intimately intermixed while travelling freely, and means for receiving or leading off the resulting slurry, the said receiving or lead-off means being so positioned in relation to the nozzle that the streams become intimately intermixed before reaching it. The nozzle may open into a precipitating vessel of size and shape such that the streams of solution and precipitant formed by the nozzle become intimately intermixed before they strike a wall of the vessel, or it may open into a conduit or an open channel adapted to enclose the streams completely or partly during the whole or part of their travel. The vessel, conduit, channel or the like, as the case may be, may comprise a liquid inlet whereby further precipitant may be introduced to dilute the slurry of precipitate formed or to aid in sweeping the precipitate through a lead-off means. If desired, apparatus comprising a closed vessel or conduit may include an outlet for vapour from the vessel or conduit.

In one form of apparatus which has been found to give very good results, the streams of cellulose acetate or other solution and of the precipitant are continuously extruded at a fairly high rate of flow through a multiple nozzle comprising a central orifice, preferably an annulus, surrounded by two or more annular orifices which are preferably concentric with the central orifice, alternate orifices serving to form streams of solution and precipitant respectively. Advantageously there may be used a triple nozzle comprising a central orifice, preferably an annulus, surrounded by two annular orifices concentric with it, the precipitant being extruded through the innermost (i.e. the central) and the outermost orifices, and the cellulose acetate solution through the middle orifice. By this means there is obtained a stream of annular cross-section of the cellulose acetate solution, which is bounded on both sides by a stream of precipitant. Other arrangements can however be used. For example a nozzle having only a central circular or annular orifice and an outer annular orifice may be used, the cellulose acetate solution then being extruded preferably through the central orifice, and the precipitant through the surrounding annular orifice. Again, the solution and the precipitant may be extruded through adjacent parallel slots; if the nozzle contains three such slots, the solution may be extruded through the medial slot and the precipitant through the two lateral slots. Adjacent orifices of other shapes, e.g. circular orifices, can be used, though in general with less advantage. For the purpose of the present specification all such extrusion devices are included within the term "nozzle."

Whatever form of nozzle is used, the lips of the orifices are preferably so shaped as to promote intimate intermixing of the several streams. For example, when the nozzle forms an annular stream of cellulose acetate solution enclosed between two annular streams of precipitant as described above, the innermost stream of precipitant may be caused to diverge and/or the outermost to converge slightly. Similarly, when the nozzle has three slot-like orifices, the lips of the orifices may be so shaped as to cause the two lateral streams to converge slightly. Furthermore, whatever the shape of the orifices their lips may have an uneven surface; for example, they may comprise a number of small trenches, channels or the like giving them a corrugated or serrated edge. Such trenches or the like may be parallel to the direction of flow of the liquids through the nozzle or at an angle to it. Alternatively or in addition, mixing of the streams may be assisted by causing them to travel at difference speeds; usually it is preferable that a stream of precipitant should travel a good deal faster than a stream of cellulose acetate solution with which it is in contact.

In one form of apparatus in accordance with the invention, the nozzle opens into a precipitating vessel of size and shape such that it allows the streams formed by the nozzle a free path long enough for them to become intimately intermixed before they reach a wall of the vessel. For example, the nozzle may open into one end of a vessel of circular cross-section, or a vessel of elliptical or rectangular cross-section having its height greater than its width, the nozzle being so positioned as to project the streams of solution and precipitant along the length of the vessel. Alternatively the nozzle may open into the bottom of such a vessel near to one of its ends. The nozzle may for instance be at an angle of 30°–60° to the vertical, depending on the shape of the vessel. The vessel is also provided with a liquid outlet adapted to lead off the slurry produced to a separating means or to storage, and if desired with a liquid inlet through which further precipitant may be introduced. Preferably the vessel is slightly inclined, the nozzle, and advantageously also the liquid inlet if one is provided, being at or near its higher end and the liquid outlet at its lower end. The vessel may if desired also comprise a lead-off for vapour.

In another form of apparatus, the nozzle opens into one end of a conduit of cross-section, at least over most of its length, similar to or not much greater than that of the area enclosed by the outermost orifice or orifices of the nozzle. For example, when the triple annular nozzle described above is used, a cylindrical conduit of diameter mainly about the same as, or a little greater than, that of the outermost orifice may be used; such a conduit may conveniently be expanded somewhat at its input end so as to surround at least the output end of the nozzle. The conduit preferably is for the most part horizontal or sloping slightly downwards, and is provided at a point remote from the nozzle with an outlet pipe or the like for leading-off the slurry of precipitate formed. If desired a liquid inlet may be provided through which further amounts of precipitant may be introduced, either near the nozzle or further along the length of the conduit.

Figure 2:
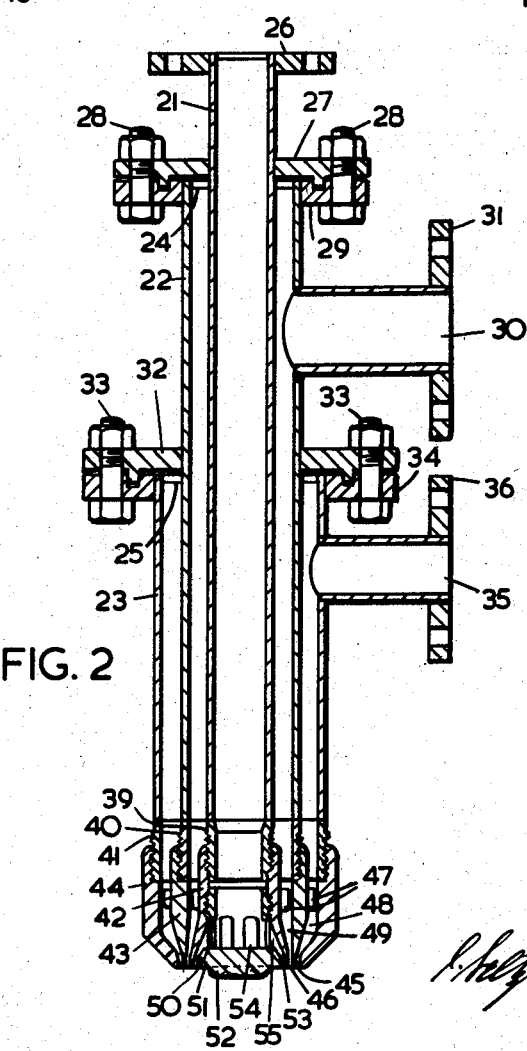

Apparatus in accordance with the invention is illustrated in the accompanying drawings, in which Figure 1 represents diagrammatically and in section one form of precipitating apparatus, Figure 2 is a sectional view on an enlarged scale and in more detail of the nozzle shown in Figure 1, Figure 3 represents diagrammatically and in section another form of precipitating apparatus, Figure 4 is a plan view of another form of nozzle, Figure 5 is a sectional view taken on the line 5—5 in Figure 4, and Figure 6 is a sectional elevation of a third form of nozzle.

Referring now to the drawings, the apparatus illustrated in Figure 1 comprises a precipitating vessel 10 through the bottom of which at one end extends a triple annular nozzle 11 set at about 45° to the vertical, and which is provided with a further inlet 12 for liquid near the nozzle 11, and with an outlet 13 at its other end by means of which a slurry of precipitate may be run off from the vessel. The height and length of the vessel 10 are such as to allow streams of solution and precipitant leaving the nozzle 11 at a fairly high speed to complete their trajectory without impinging on any wall of the vessel. The vessel 10 may be circular in cross-section, but an economy in material and space may be achieved by making it considerably higher than it is wide, giving it, e.g. an elliptical or rectangular cross-section. The vessel slopes downwards slightly from the input end (i.e. the end at which the nozzle 11 and the inlet 12 open into it) to the output end, so assisting the discharge of liquid from the vessel through the outlet 13. The nozzle 11 is provided with feed pipes 14 and 15 for precipitant and a feed pipe 16 for the solution to be precipitated. The feed pipes 14 and 15 are themselves fed from a common feed line 17.

The nozzle 11, shown in greater detail in Figure 2, comprises three co-axial tubes 21, 22 and 23, the innermost tube 21 being the longest and the outermost tube 23 the shortest. An annular end-piece 24, fitting closely round the innermost tube 21, closes one end of the middle tube 22, and a similar end-piece 25, fitting closely round the middle tube 22, closes the corresponding end of the outermost tube 23. The corresponding end of the innermost tube 21 carries a flange 26 by means of which the nozzle is attached to the precipitant feed pipe 14.

The tube 21 is provided with a fixed collar 27, secured by bolts 28 to a flange 29 on the end of the middle tube 22, the collar 27 being just clear of the end piece 24. An inlet pipe 30 enters the tube 22 near its closed end, and carries a flange 31 whereby it is attached to the solution feed pipe 16.

The tube 22 is provided with a fixed collar 32, secured by bolts 33 to a flange 34 on the end of the tube 23, the collar 32 being just clear of the end piece 25. An inlet pipe 35 enters the tube 23 near its closed end, and carries a flange 36 whereby it is attached to the precipitant feed pipe 15.

At their output ends the tubes 21, 22 and 23 are welded to externally threaded connecting sections 39, 40 and 41 respectively, onto which are screwed internally threaded annular members 42, 43 and 44 respectively, so shaped as to form a narrow slightly converging annular orifice 45 bounded by the lips of the outermost member 44 and the middle member 43, and another narrow annular orifice 46, neither converging nor diverging, bounded by the lips of the middle member 43 and the innermost member 42. Fins 47 are provided in the passages 48, 49 leading to these orifices.

An externally threaded tubular member 50 is screwed into the innermost annular member 42 and in effect forms a short extension of the innermost tube 21. At its end the tubular member 50 carries a circular disc 51 having a hexagon boss 52, the diameter of the disc 51 being slightly less than the internal diameter of the innermost annular member 42 at its lip, so that it forms therewith a third and innermost annular orifice 53. The edge of the disc 51 and the innermost annular member 42 are so shaped as to cause the annular orifice 53 to diverge slightly. Ports 54 adjacent to the disc 51 lead from the interior of the tubular member 50 to the annular passage 55 between the forward ends of the tubular member 50 and the innermost annular member 42.

In operation a cellulose acetate or other solution to be precipitated is pumped through the feed pipe 16 and the inlet 30 of the nozzle 11 into the space between the innermost tube 21 and the middle tube 22, and flows along this space to the passage 49 and thence to the middle annular orifice 46. At the same time precipitant is pumped through the feed line 17 and then through the feed pipe 14, the innermost tube 21, the tubular member 50, the ports 54 and the passage 55 to the slightly diverging innermost orifice 53, and also through the feed pipe 15, the inlet 35, the space between the outermost tube 23 and the middle tube 22, and the passage 48 to the slightly converging outermost orifice 45. Preferably the streams of precipitant leave the orifices 45 and 53 at a linear speed considerably higher than that at which the solution leaves the orifice 46. The streams of precipitant and solution start to intermix as soon as they have left the nozzle 11, and the composite stream which they form follows a roughly parabolic path, rising near to the top of the vessel 10, and falling to the bottom at a point short of the outlet 13. By the time the composite stream has reached the bottom of the vessel the solution and the precipitant have become intimately intermixed, and the cellulose acetate has come out of solution as a flake precipitate forming a slurry in the mixture of solvent and precipitant. Further precipitant may be fed into the vessel through the inlet 12, and flowing down the inclined vessel will then dilute and help to sweep the slurry through the outlet 13 and out of the vessel.

The apparatus illustrated in Figure 3 comprises a triple annular nozzle 60 of the construction shown in Figure 2 and described in detail above, provided with feed pipes 61 and 62 for the precipitant and a feed pipe 63 for the solution to be precipitated. The feed pipes 61 and 62 are fed from a common feed line 64. The nozzle 60 opens into one end of a conduit 65 having a bore (except in the immediate vicinity of the nozzle) substantially equal to the outside diameter of the outermost annular orifice of the nozzle. At its input end 66 the conduit 65 expands and fits around the nozzle 60, forming with it a liquid-tight joint. Over most of its length the conduit 65 is horizontal, but near its output end 67 it turns vertically downwards.

In operation precipitant and solution are fed to the nozzle 60 so as to form a stream of solution bounded on both sides by more rapid streams of precipitant. In the conduit 65 these streams of precipitant and solution are intimately intermixed, and the cellulose acetate is precipitated. The slurry of precipitate in the mixture of solvent and precipitant leaves the conduit through the vertical outlet 67.

From the outlet 13 (Figure 1) or 67 (Figure 3) the slurry of precipitate may be fed to any desired form of device for separating the precipitate from the liquid.

Another type of nozzle, that may be employed in place of that illustrated in Figure 2, is shown diagrammatically in Figures 4 and 5. In this nozzle the orifices have the form of narrow parallel slots. The nozzle comprises an outer cylindrical member 71 provided with a liquid inlet 72 and, opposite to it, a fairly wide passageway 73 of rectangular cross-section extending along the whole length of the member 71 and terminating in a somewhat narrower opening 74. Inside the cylindrical member 71 is a co-axial second cylindrical member 75 of smaller diameter, fed by a pipe 76 passing through the outer member 71. The cylindrical member 75 opens into a passageway 77 of rectangular cross-section extending along the whole length of the member 75 and situated symmetrically within the passageway 73; the passageway 77 narrows to a slot-like orifice 78, the lips of which are slightly corrugated and form with the lips of the opening 74 two further slot-like orifices 79 and 80 symmetrically situated on either side of the orifice 78. The cylindrical members 71 and 75 are closed by common end walls 81.

In working with the nozzle shown in Figures 4 and 5 a cellulose acetate solution to be precipitated is pumped through the feed pipe 76 to the inner cylindrical member 75 and thence through the middle orifice 78, and precipitant is pumped through the inlet 72 to the space between the cylindrical members 71 and 75 and thence through the orifices 79 and 80 on either side of the orifice 78. The corrugations in the lips of the orifice 78 give rise to turbulence at the boundaries of the streams of precipitant and solution, so accelerating their intermixing.

A third form of nozzle is illustrated in Figure 6, and comprises a cylindrical tubular member 91 having at one end an inlet 92 for liquid, and tapering at the other end to a circular orifice 93. The tubular member 91 is surrounded by a second and co-axial tubular member 94 provided with a liquid inlet 95 and forming with the tubular member 91 an annular passageway 96. This annular passageway is closed at the end nearer the inlet 92 by means of an end wall 97 fitting closely round the tubular member 91, and at the other end it tapers to form a slightly converging annular orifice 98 concentric with the circular orifice 93.

In working with the nozzle shown in Figure 6 it is preferable to pump the cellulose acetate solution through the inner tubular member 91 and the circular orifice 93, and the precipitant through the annular passageway 96 and the slightly converging annular orifice 98, but these positions may be reversed.

The invention is further illustrated by the following example; the "parts" given are by weight.

*Example*

A solution of an acetone-soluble cellulose acetate in about three times its weight of a 75% aqueous acetic acid at 65°–70° C. was obtained by pretreating cellulose with acetic acid, acetylating the pretreated cellulose using methylene chloride as the solvent and sulphuric acid as catalyst, ripening the cellulose acetate at 65°–70° C. after adding water, acetic acid and further sulphuric acid, distilling off the methylene chloride, and neutralising the sulphuric acid with an aqueous solution of sodium acetate. This solution, still at a temperature of 65°–70° C., was forced through the middle annular orifice of a triple annular nozzle extending either into a precipitating vessel of rectangular cross-section or into a closed conduit of circular cross-section, both as described by reference to the drawings; at the same time aqueous acetic acid of concentration between 7.4 and 14% and at a temperature of 70° C. was forced at a considerably higher linear speed through the innermost and outermost annular orifices of the nozzle. When the precipitating vessel was employed, further aqueous acetic acid of the same concentration and at the same temperature was introduced through the liquid inlet in the neighbourhood of the nozzle. The streams of cellulose acetate solution and aqueous acetic acid extruded from the nozzle rapidly became intimately intermixed, forming a slurry of precipitated cellulose acetate in aqueous acetic acid. This slurry, which when using the apparatus comprising a precipitating vessel was reduced in consistency by the further aqueous acetic acid introduced through the liquid inlet, was run off from the vessel or from the conduit and subsequently treated to separate the precipitate from the liquid by decantation. The precipitate obtained by this method was readily washed free from acid.

While the invention has been described with particular reference to the production of cellulose acetate and its precipitate from solution, it is of value also in the production and precipitation of other organic substances of very high molecular weight, especially cellulose esters such as cellulose propionate, butyrate, acetate propionate, acetate butyrate, and acetate stearate, and cellulose ethers, for example water-soluble methyl cellulose and water-soluble and organic solvent-soluble ethyl celluloses. Exampes of other compounds of very high molecular weight in the production of which the process of the invention may be used are polyvinyl compounds such as polyvinyl chloride, polyvinyl alcohol, and polyvinyl acetate, and copolymers derived from two or more vinyl or vinylidene compounds, e.g. copolymers of vinylidene chloride and acrylonitrile. Such compounds may be precipitated either from true solutions or from latices, which for the purposes of this specification are included with the term "solutions."

Having described my invention, what I desire to secure by Letters Patent is:

1. Process for the precipitation of a cellulose ester of at least one lower fatty acid having 2 to 4 carbon atoms in the molecule from solution in a solvent which is a liquid at ordinary temperatures, which comprises forming a stream of the solution, forming at least one stream of a precipitant flowing in the same direction as and in contact with, substantially completely surrounding, and approximately parallel to the stream of solution, and causing the streams of solution and precipitant to intermix completely while they are still travelling freely.

2. Process for the precipitation of cellulose acetate from solution in acetic acid by means of a precipitant selected from the group which consists of water and aqueous acetic acid of concentration below 40%, which comprises forming a stream of the solution, forming at least one stream of the precipitant flowing in the same direction as and in contact with substantially completely surrounding, and approximately parallel to the stream of solution, and causing the streams of solution and precipitant to intermix completely while they are still travelling freely.

3. Process according to claim 1, wherein the amount of precipitant in the streams is at least sufficient to precipitate substantially the whole of the cellulose ester in the said streams on complete mixing of the streams.

4. Process according to claim 2, wherein the amount of the precipitant in the streams is at least sufficient to precipitate substantially the whole of the cellulose acetate in the said streams on complete mixing of the streams.

5. Process according to claim 3, wherein the solution travels initially at a lower linear speed than the precipitant.

6. Process according to claim 1, wherein the streams of solution and precipitant become intermixed while in free flight.

7. Process according to claim 5, wherein after the streams of solution and precipitant have become intermixed the resulting slurry is diluted with further precipitant.

8. Process according to claim 1, wherein the streams of solution and precipitant become intermixed in a closed conduit.

9. Process for the precipitation of cellulose acetate from solution in acetic acid by means of a precipitant selected from the group which consists of water and aqueous acetic acid of concentration below 40%, which comprises forming at least one stream of the solution, and at least one stream of the precipitant flowing in the same general direction and at a higher speed than that of the solution and in contact therewith over the whole of its surface, and causing the said streams to intermix completely while they are still travelling freely, the amount of precipitant being at least sufficient to precipitate substantially all the cellulose acetate on said intermixing.

10. Process according to claim 4, wherein the solution travels initially at a lower linear speed than the precipitant.

11. Process according to claim 10, wherein the streams of solution and precipitant become intermixed while in free flight.

12. Process according to claim 11, wherein after the streams of solution and precipitant have become intermixed the resulting slurry is diluted with further precipitant.

13. Process according to claim 10, wherein the streams of solution and precipitant become intermixed in a closed conduit.

References Cited in the file of this patent

UNITED STATES PATENTS

| | | |
|---|---|---|
| 1,567,482 | Anthony | Dec. 10, 1919 |
| 1,859,992 | Seil | May 24, 1932 |
| 1,948,625 | Mason | Feb. 27, 1934 |
| 1,949,213 | Mason | Feb. 27, 1934 |
| 2,527,689 | Suthard et al. | Dec. 11, 1946 |
| 2,534,253 | Fash | Dec. 19, 1950 |
| 2,622,273 | Detwiler | Dec. 23, 1952 |
| 2,647,103 | Griffith et al. | July 28, 1953 |
| 2,702,280 | Mackinnon | Feb. 15, 1955 |
| 2,703,304 | Paladino | Mar. 1, 1955 |